United States Patent Office 3,292,674
Patented Dec. 20, 1966

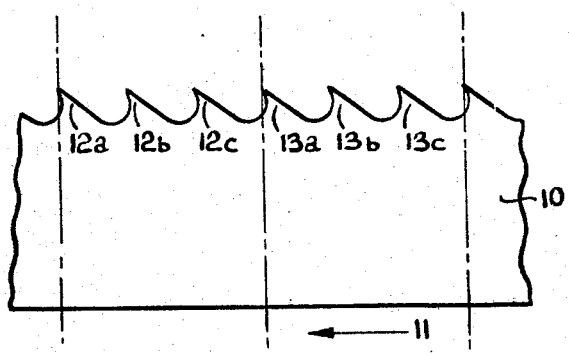
Fig. 1.
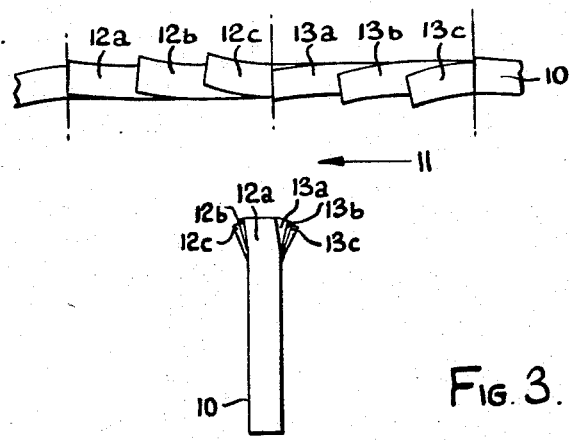
Fig. 2.
Fig. 3.

3,292,674
SAWS
Arthur Turner, Northfield, Birmingham, England, assignor to High Duty Saws Limited, Birmingham, England, a British company
Filed Jan. 20, 1964, Ser. No. 338,778
2 Claims. (Cl. 143—133)

The invention relates to saw blades having teeth extending along an edge of the blade, some, or all of these teeth having a set. By "set" is meant that one of the side faces of the tooth concerned is off-set laterally so as to project laterally outwardly beyond the same side face of the part of the blade adjacent to the base of the tooth. Usually a set is imparted to a tooth by bending the tooth so that the outer, laterally off-set face has an inclination to the adjacent side face of the blade when viewed in two mutually perpendicular directions. When the teeth are viewed along the blade the outer side face of each set tooth is such that it diverges with respect to the median plane of the blade, from the base of the tooth towards its apex.

When the teeth are viewed in plan, in the general plane of the blade, the outer side face of each set tooth diverges from the median plane of the blade when proceeding along this direction in the direction of cutting travel of the blade.

As viewed at the toothed edge of the blade in plan, the set given to the teeth of the blade has hitherto been in accordance with any of the following commonly adopted arrangements:

(1) Immediately successive teeth of the blade have been set to the left side and to the right side of the blade.
(2) Two immediately successive teeth of the blade have been set one to the left side of the blade and one to the right side of the blade respectively followed by an unset tooth whereof the median plane coincides with the median plane of the blade, this arrangement being repeated for each succeeding group of three teeth along the blade.
(3) The marginal portion of the blade immediately adjacent to the teeth has been deformed laterally in a wave shape (this being adopted primarily in cases where the teeth are of such small size that setting of the teeth individually is difficult) so that the teeth then consist of successive groups deflected to the left side and to the right side of the blade so that in each group the set of the teeth increases gradually from the leading tooth of the group up to the centre of the group and then decreases gradually.

The present invention is based upon appreciation of the reasons why none of these previously adopted forms of set are wholly satisfactory to meet the conditions of operation encountered by saw blades in use and to achieve the optimum combination of high rate of cut, good surface finish of the faces bounding the plane of cut, and accuracy of cut.

With a conventional set of the kind referred to in sub-paragraph 1 above, the degree of set, that is to say the distance by which the outer side face of a tooth is off-set from the adjacent side face of the blade at the point at which the side face of the tooth has undergone maximum lateral displacement, is generally identical for each tooth set. The degree of set is determined by factors such as the necessity for ensuring that the blade as a whole can run freely through the slot in the workpiece cut by the blade, and that there shall be sufficient space for clearance of material cut from the workpiece by the teeth. When these conditions are satisfied each individual tooth may be subjected to heavy loading, by virtue of its set, as the leading edge face of each tooth comes into contact with the workpiece.

Consequently, the life of the saw blade may be reduced. Also if blunting of the teeth set to one side of the blade should occur before equivalent blunting occurs in respect of teeth set to the other side such, for example, as may occur through a local hardness in the workpiece, there is a tendency for the blade to "run off" and an accurate cut is not made. Furthermore, high loading of the teeth militates against the obtaining of a good surface finish.

These effects also occur with the set referred to in sub-paragraph 2 above and additionally in this case the unset tooth makes a smaller contribution to removal of material than each of the set teeth, so that some inefficiency as to the rate of cut may be inherent in this form of set.

With the wavy set, referred to in sub-paragraph 3 above, the set teeth in the trailing half of each wave, where the set of successive teeth is decreasing, again make little contribution to removal of material, in that they travel through the workpiece in a path from which material has already been removed from the workpiece by the leading teeth of the particular group concerned. Moreover, it is only the few teeth at the "crest" of the wave that do any cutting so that they are highly loaded.

The object of the present invention is to provide a saw blade having a new or improved form of set whereby one or more of these disadvantages are avoided or reduced.

Accordingly the present invention provides a saw blade wherein all the set teeth are arranged in groups, the teeth of each group occupying successive positions along the blade without the teeth of any other group intervening between them, all the teeth in each group being set to the same side of the blade, the teeth in adjacent groups being set to different sides of the blade and the degree of set of the teeth in each group increasing from a minimum at the leading end of the group to a maximum at the trailing end of the group.

In the specification and claim, the terms "leading end" and "trailing end" are defined as having reference to the direction of cutting travel of the blade so that when the blade is executing its cutting travel the leading end passes a fixed point on the workpiece prior to the trailing end.

The number of teeth contained in each such group may vary with the size of the teeth and the number of teeth per unit length of the blade. Typically groups would contain three or four teeth, but they might contain only two teeth or a greater number than four if desired.

In the operation of removing material from a workpiece by sawing, each tooth which has some degree of set when first brought into contact with the workpiece removes a particle of material therefrom by a shearing action in two planes. One of these planes is parallel, or approximately parallel, to the side face of the saw blade to which the tool is set, and the other plane is at right agles to this first plane and is parallel, or approximately parallel, to the plane in which the transversely extending ridge or apex of the tooth moves.

When using a conventional saw blade in which all the set teeth have the same and hence the maximum required degree of set, the area of the second shear plane is determined by the maximum degree of set and the force required to move the particle of material depends partly on this area.

When using a saw blade in accordance with the present invention, the area of such plane is substantially less than that which would correspond to the maximum degree of set. If the teeth of a group have respective degrees of set increasing uniformly from the first or leading tooth up to the last or trailing tooth, the latter having the maximum set, then the area of the second shear plane for each tooth would be equal to the area of the shear plane pertaining to a conventionally set saw divided by the number of teeth in each group.

Consequently the shearing forces, which it is necessary for each tooth to exert to remove its particle of material, are less than those which pertain to a conventional saw.

In practice this improves both the rate of cut which can be obtained for given relative speeds of movement of the saw and workpiece and for a given contact pressure applied between the saw and workpiece in the plane of the blade. Furthermore, the side faces of the slot formed by the blade in the workpiece have a better i.e. smoother, surface finish.

Since each tooth is, in effect, removing a thinner slice or particle of workpiece material, there is less likelihood of the tooth becoming blunted prematurely and there is less likelihood of inaccuracy of cut arising from the saw blade running off from the intended plane of cut.

This invention will now be described, by way of example, with reference to the accompanying drawing wherein:

FIGURE 1 shows, in side elevation, a fragment of the length of a saw blade embodying the invention;

FIGURE 2 is a plan view looking towards the toothed edge of the saw blade of FIGURE 1; and FIGURE 3 is a view in end elevation looking along the blade towards the leading end of the saw blade of FIGURES 1 and 2.

The saw blade may be made of any conventional metal, for example, high carbon high speed steel or alloy steel, capable of being hardened and tempered. The blade 10 shown in FIGURE 1 is a fragment of a saw band, but it will be understood that the invention may be applied to other types of saw blades, for example, hacksaw blades or saw blades of hand saws, whether of the cross-cut, ripping or tenon types.

Along one edge, the saw blade 10 is formed with teeth which may be of any suitable profile as viewed in side elevation. In this example the teeth have their steeper edge faces presented forwardly in the direction of cutting travel of the blade 10, which is indicated by the arrow 11, and their less steep edge faces presented rearwardly.

All the set teeth are arranged in groups and the teeth in adjacent groups are set to opposite sides of the blade. Thus the teeth in some of the groups are set to the right-hand side of the blade, viewed forwardly along the direction cutting of travel of the blade, the teeth of one such group being indicated at 12a, 12b, 12c. The teeth in the other groups, such as those indicated at 13a, 13b, 13c are set to the left-hand side of the blade.

In each group of teeth the leading tooth 12a or 13a has the smallest degree of set and the trailing tooth 12c or 13c has the largest degree of set, the intervening tooth 12b or 13b having a degree of set which is intermediate between the sets of the leading and trailing teeth. If more than one intermediate tooth is provided then the set of the intermediate teeth will increase from the leading end of the group towards its trailing end.

The degree of set need not increase uniformly from the leading tooth of a group towards the trailing tooth.

In a typical case where a saw blade has eight teeth per inch and of the profile shown in FIGURE 1, such that the depth of each tooth measured from its apex to its base is of the order of 0.062 inch, the degrees of set for the various teeth in a group of three may be as follows. The first tooth in the group may have a set of 0.004 inch. The second tooth may have a set of 0.007 inch, and the third tooth may have a set of 0.011 inch. The thickness of the blade in this case may typically be of the order of 0.031 inch.

In imparting set to the teeth, these may be bent from the remainder of the blade in such a way that the outer side face of each tooth is divergent lengthwise of the cutting edge of the blade, with respect to the side face of the blade in the forward direction of cutting travel, and is also divergent with respect to the side face of the blade in a direction from the base of the tooth towards its apex, as will be evident from FIGURES 2 and 3.

It is within the scope of the invention, if desired, to include some unset teeth, i.e., teeth whereof both side faces are co-incident with respective side faces of the remainder of the blade. Such unset teeth can be disposed between the groups of teeth 12a to 12c and 13a to 13c.

Each tooth may be set individually in saws where the teeth are sufficiently large but it is preferred to set the teeth in groups by means of inclined hammers. Where the teeth are too small to be set individually, the teeth are set in groups, for example, with a pitch of thirty-two teeth to the inch, the teeth may be set in half-inch groups of sixteen teeth each. Where the blade is formed of a metal which is subjected to heat treatments the settings may be carried out preparatory to hardening and tempering.

The invention may, of course, be applied to blades formed of other materials such as stainless steel which is employed in saw bands and in saw blades for meat and other foodstuffs which require to be cut.

What I claim then is:

1. A saw blade comprising a blade having teeth extending along an edge thereof, said teeth being arranged in immediately following groups of at least three teeth per group and said groups each having leading and trailing ends, all the teeth in each group being set to the same side of the blade, the teeth in adjacent groups being set to different sides of the blade and the degree of set of the teeth in each group increasing from a minimum at the leading end of the group to a maximum at the trailing end of the group.

2. A saw blade according to claim 1, wherein the degree of set of the teeth in each group increases non-uniformly from said minimum to said maximum.

References Cited by the Examiner

UNITED STATES PATENTS

| | | | |
|---|---|---|---|
| 573,812 | 12/1896 | Bradley | 143—133 |
| 603,128 | 4/1898 | Clemson | 143—133 X |

FOREIGN PATENTS 304,808  4/1955  Switzerland.

DONALD R. SCHRAN, *Primary Examiner.*